United States Patent [19]

Puretic

[11] 4,081,075
[45] Mar. 28, 1978

[54] FISH FLUME APPARATUS

[76] Inventor: Mario J. Puretic, 259-6th Ave. North, Monte Cristo Isle, Tierra Verde, Fla. 33715

[21] Appl. No.: 583,282

[22] Filed: Jun. 3, 1975

[51] Int. Cl.² .......................................... B65G 15/60
[52] U.S. Cl. ............................. 198/812; 193/25 C; 198/758; 198/862
[58] Field of Search ............... 198/89, 204, 575, 596, 198/758, 862, 812; 193/25 C; 292/256, 73; 269/143, 249, 250, 251; 52/584

[56] References Cited

U.S. PATENT DOCUMENTS

| 1,854,560 | 4/1932 | Owens et al. | 198/204 |
| 2,830,632 | 4/1958 | LaRouche | 269/143 X |

FOREIGN PATENT DOCUMENTS

| 1,028,163 | 5/1958 | France | 198/204 |
| 1,029,780 | 5/1958 | Germany | 198/204 |
| 350,702 | 6/1931 | United Kingdom | 198/758 |

*Primary Examiner*—Evon C. Blunk
*Assistant Examiner*—Douglas D. Watts
*Attorney, Agent, or Firm*—Fulwider, Patton, Rieber, Lee & Utecht

[57] ABSTRACT

Fast-assembly flume apparatus for transferring fish during fish loading and unloading operations. The apparatus includes a plurality of like, generally half-hexagonal flume members. These flume members are nestable to permit compact stowing and are positionable in a longitudinal array for transferring fish along a desired path. A power-driven endless belt may be built into auxiliary units of the flume members to facilitate fish transfer.

5 Claims, 12 Drawing Figures

U.S. Patent   March 28, 1978   Sheet 1 of 3   4,081,075
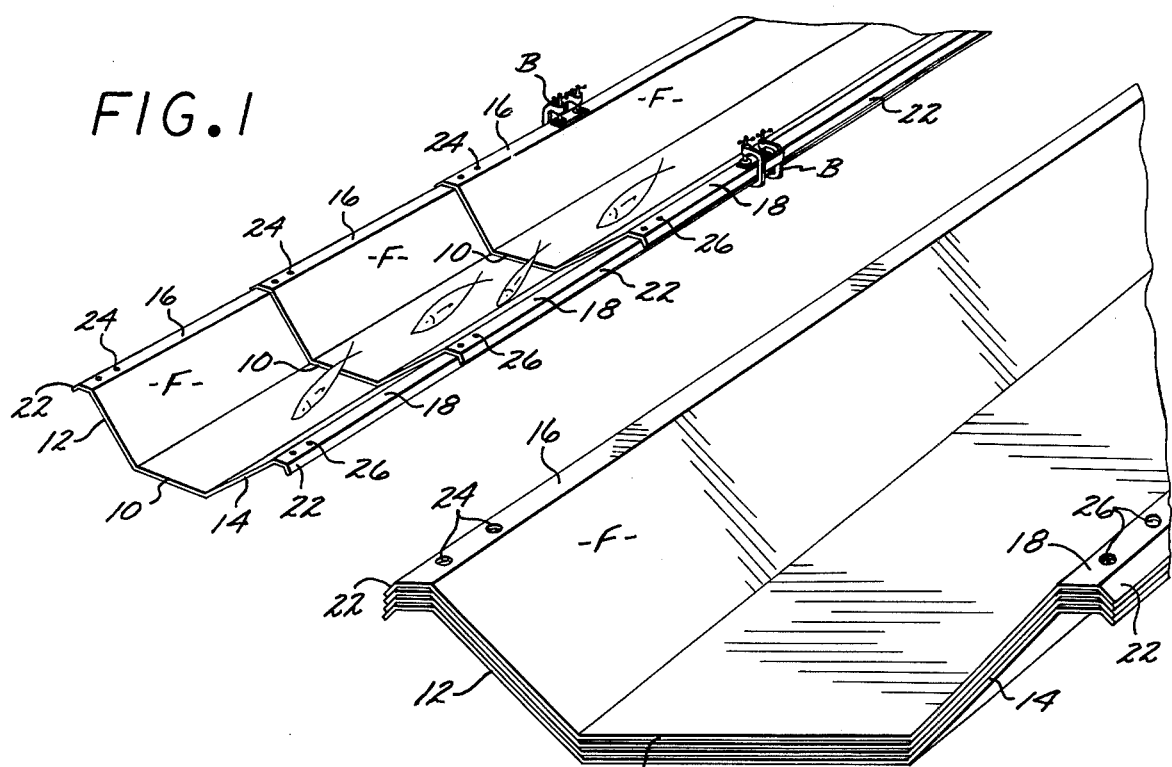
FIG. 1
FIG. 2
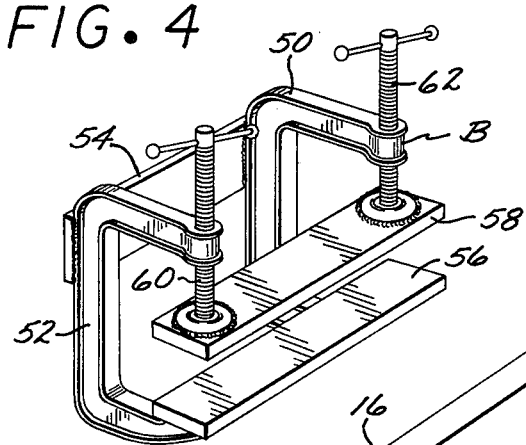
FIG. 4
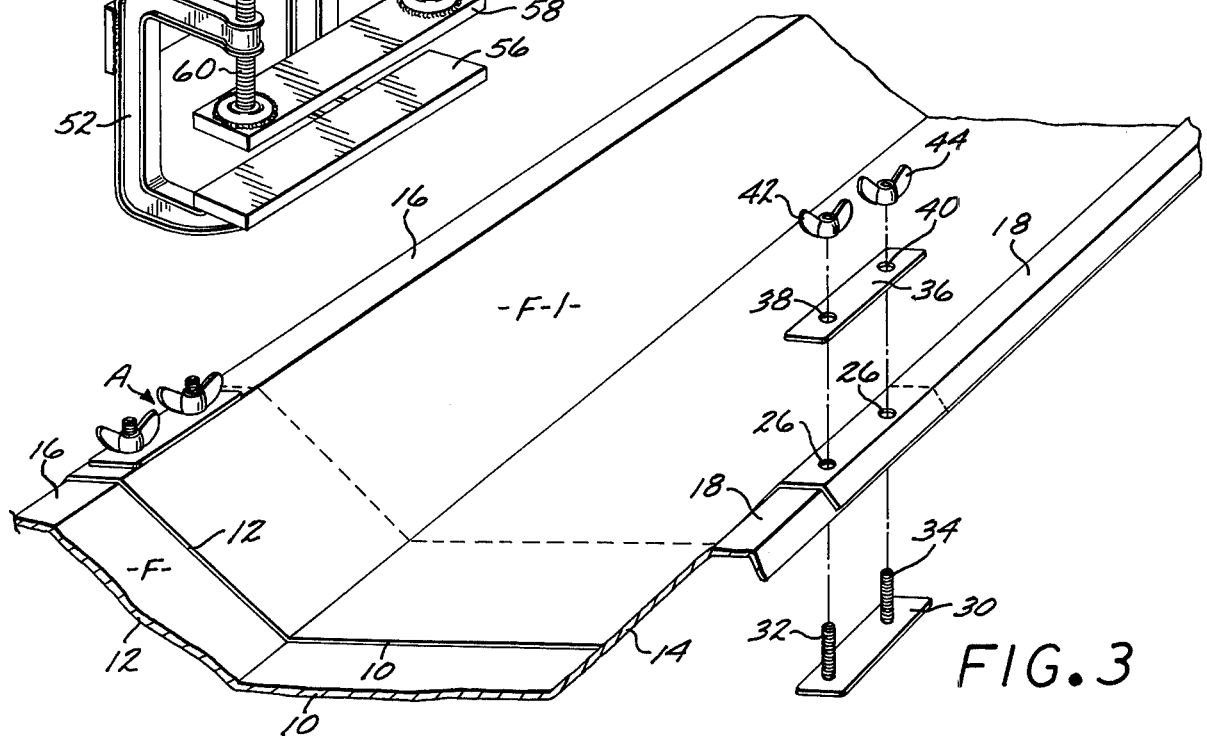
FIG. 3

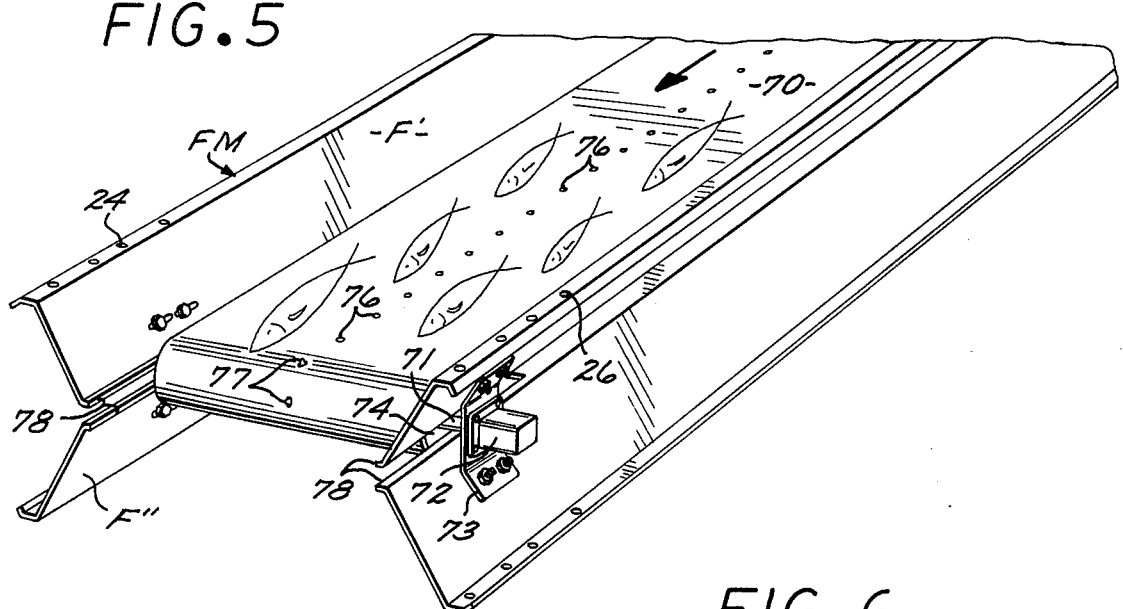
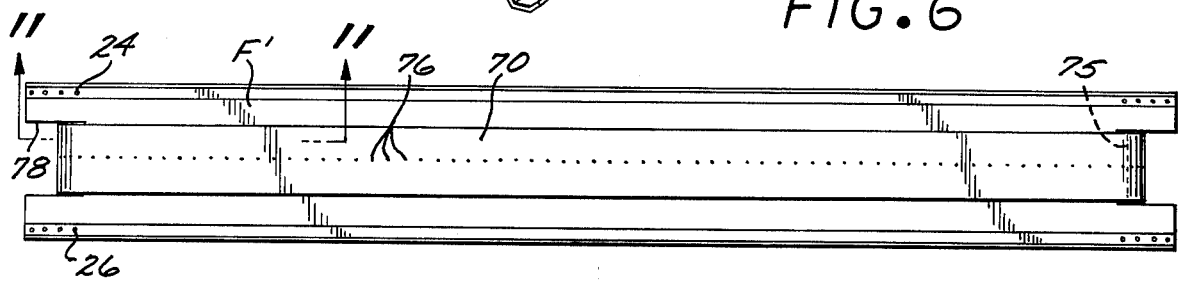
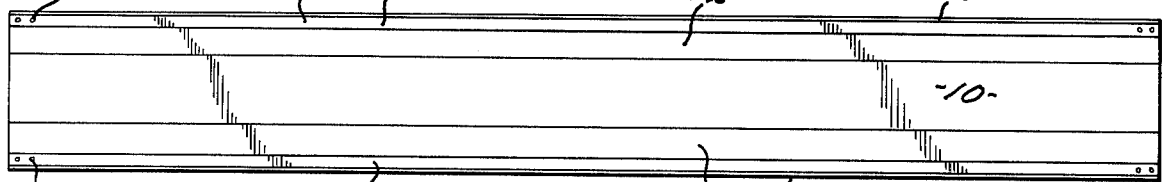
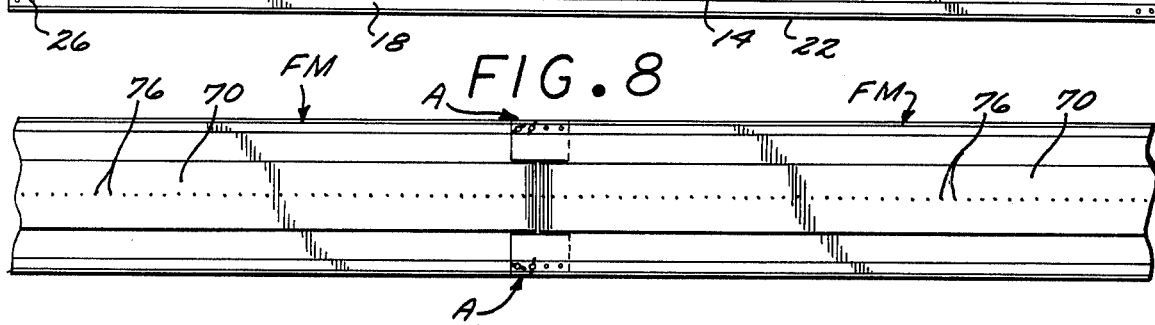
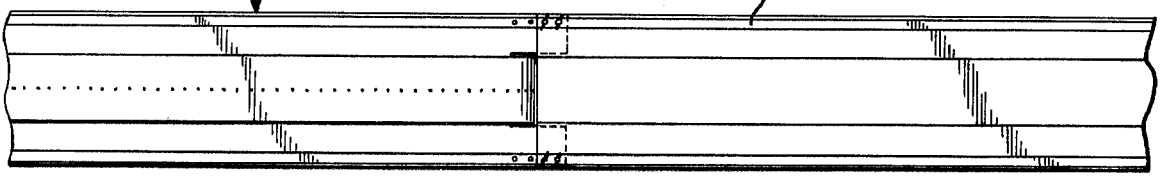

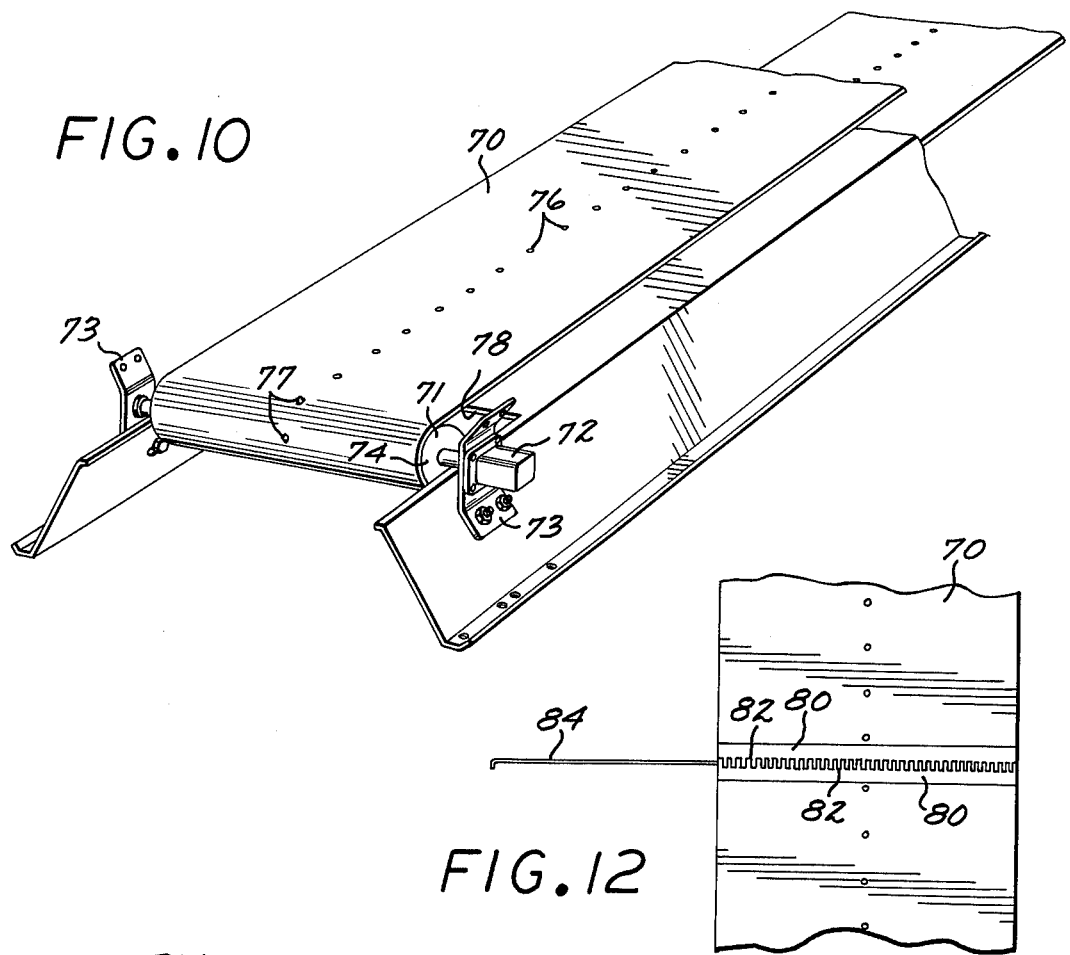
FIG. 10
FIG. 12
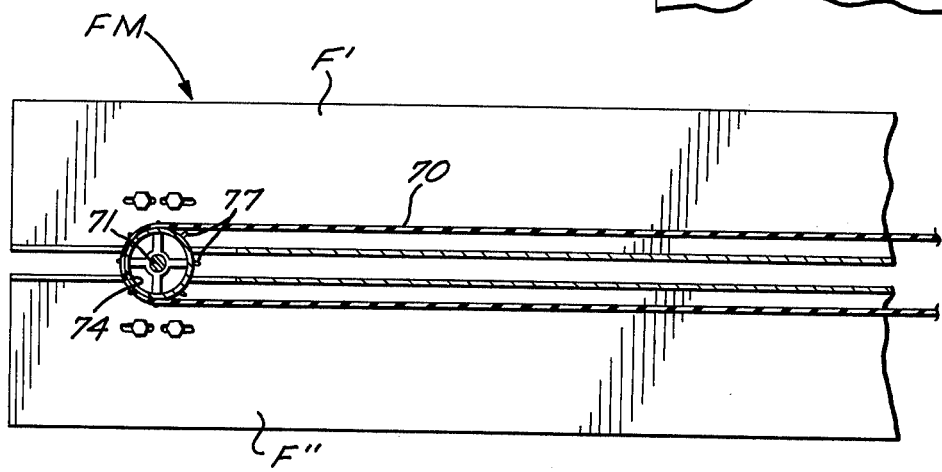
FIG. 11

FISH FLUME APPARATUS

BACKGROUND OF THE INVENTION

1. Field of the Invention

The present invention relates generally to the art of fishing and, more particularly, to novel fast-assembly flume apparatus for fish loading and unloading operations.

2. Description of the Prior Art

It is conventional to utilize a plurality of interconnected chutes of half-round transverse cross-section in fish loading and unloading operations. The half-round configuration of such chutes creates unnecessary friction hampering gravity movement of the fish therealong. Additionally, such chute sections are difficult to connect and disconnect. These half-round chutes are also bulky and difficult to stow. This is a particular disadvantage where such chutes must be stowed on shipboard.

SUMMARY OF THE INVENTION

It is a major object of the present invention to provide flume apparatus that includes a plurality of like flume members of generally half-hexagonal transverse cross-section which are readily connected together to define a predetermined path along which the fish are moved.

Another object of the present invention is to provide fast-assembly flume apparatus of the aforedescribed nature wherein the flume members are readily knocked-down and nestable for stowing.

A further object of the present invention is to provide fast-assembly flume apparatus of the aforedescribed nature wherein at least some of the flume members are provided with a power-driven endless belt that receives and transports the fish along such belt-equipped flume members.

It is another object of the present invention to provide fast-assembly flume apparatus of the aforedescribed nature which is designed for ruggedness yet is lightweight whereby it may afford a long and trouble-free service life.

These and other objects and advantages of the present invention will become apparent from the following detailed description.

BRIEF DESCRIPTION OF THE DRAWINGS

FIG. 1 is a broken perspective view showing a preferred form of fast-assembly fish flume apparatus embodying the present invention arranged in telescoped array;

FIG. 2 is a broken perspective view in enlarged scale showing a plurality of said flume members nested for stowage;

FIG. 3 is a broken perspective view showing how adjoining overlapped portions of such flume members may be releasably fastened together;

FIG. 4 is a vertical sectional view showing a modified arrangement for temporarily fastening overlapped portions of flume members together;

FIG. 5 is a broken perspective view showing a modified form of fast-assembly fish flume apparatus embodying the present invention utilizing a power-driven endless belt;

FIG. 6 is a top plan view in reduced scale showing a belt-equipped fish flume member;

FIG. 7 is a top plan view similar to FIG. 6 showing a non-belt fish flume member;

FIG. 8 is a top plan view showing how two of the flume members of FIG. 6 may be interconnected;

FIG. 9 is a broken top plan view showing a belt-driven flume member connected to a non-belt flume member;

FIG. 10 is a broken perspective view showing an inverted belt-driven flume member;

FIG. 11 is a vertical sectional view taken along line 11—11 of FIG. 6; and

FIG. 12 is a broken top plan view showing how a belt may be separated.

DESCRIPTION OF THE PREFERRED EMBODIMENTS

Referring to the drawings, a preferred form of fast-assembly fish flume apparatus embodying the present invention comprises a plurality of like flume members F which may be arranged in telescoping order as shown in FIG. 1. Each flume member is generally half-hexagonal in transverse cross-section having a horizontal bottom wall 10 and upwardly and outwardly extending side walls 12 and 14. The upper ends of side walls 12 and 14 are provided with flanges 16 and 18, respectively. The outer edges of such flanges are turned down so as to increase stiffness, as indicated at 20 and 22, respectively. The flangles 16 and 18 are formed along their entire length with a plurality of longitudinally spaced apertures 24 and 26, respectively. The apertures are spaced apart equidistantly. It will be understood that the flume members F are of integral construction and will preferably be formed of sheet metal, although other suitable materials may be utilized. It should be particularly noted that thin gauge metal may be employed, with two or more flume members being laminated for heavy loads and/or bridging long unsupported spans.

Referring now to FIG. 2, a plurality of the aforedescribed flume members F are shown in nested arrangement. It will be apparent that when arranged in this nested configuration the flume members take up little space, and accordingly, may be readily stowed until used. This feature is particularly advantageous where the flume members are carried on shipboard. Referring now to FIG. 3, when the flume members are to be utilized in the transfer of fish they will be positioned in a longitudinal array along a desired path, with adjoining portions of the individual flume members overlapped and suitably connected together. Thus, as indicated in FIG. 3, flume members F and F1 have been arranged with their end portions overlapping.

These flume members may be rigidly connected together in such overlapped position by means of a bolt and nut connector assembly, generally designated A. Two pairs of such assemblies A are utilized in conjunction with the flanges 16 and 18 of the flume members. Each connector assembly A includes a base plate 30 provided with a pair of upstanding threaded shanks 32 and 34, the lower ends of which are rigidly affixed to the base plate 30. These shanks 32 and 34 are spaced apart a distance corresponding to the spacing between adjoining apertures 24 and 26 formed the flanges 16 and 18, respectively. As indicated in FIG. 3, the base plates 30 are abutted against the underside of flanges 16 and 18 of the lower flume member F1, with the shanks 32 and 34 extending upwardly through apertures 24 and 26, respectively. A pad 36 having a pair of apertures 38 and 40 is lowered over shanks 32 and 34 into abutment with the upper surface of the flanges 16 and 18 of flume member F. A pair of like wing nuts 42 and 44 are tightened upon the upper portion of shanks 32 and 34 so as to urge plate member 30 and pad 36 into tight engagement with the flanges 16 and 18 and thereby temporarily rigidly connect the adjoining flume members together. It should be understood that the provision of a plurality of apertures 24 and 26 permit the adjoining flume members to be overlapped so as to adjust the span to be bridged by such adjoining flume members.

Referring now to FIG. 4, there is shown a second form of connector member B which may be utilized in place of the first connector assembly A. Connector member B may be termed a twin C-clamp. It includes a pair of conventional C-clamps 50 and 52 which are rigidly interconnected by a spacer bar 54. A lower pressure pad 54 if rigidly affixed to the free ends of the lower legs of each C-clamp and an upper pressure pad 58 is rigidly affixed to the lower ends of the externally threaded posts 60 and 62 of the C-clamps. It will be apparent that by tightening the posts 60 and 62 the upper pressure pad 58 will be moved downwardly towards the lower pressure pad 56. In use, the connector assembly B is positioned alongside the outer edges of a pair of overlapped flume members with the upper and lower pads 58 and 56 vertically aligned with the flanges 16 and 18 of the flume members. The threaded posts 60 and 62 are then tightened so as to urge the upper and lower surfaces of the flanges 16 and 18 together to thereby rigidly connect adjoining flume members together as shown in FIG. 1.

Referring now to FIGS. 5, 6 and 11, there is shown a modified form of fast-assembly fish flume apparatus FM embodying the present invention utilizing a power-driven endless belt, generally designated 70. This form of the invention includes two like flume members F' and F", with flume member F" being inverted relative to flume member F'. A conveyor belt 70 straddles the exterior surfaces of bottom walls 10' and 10", as shown particularly in FIG. 11. Belt 70 is driven by a conventional reversible motor 72 that may be powered by compressed air, pressurized hydraulic fluid or electricity. Motor 72 drives a horizontal shaft 71 that is keyed to a drive roller 74.

The flume members are releasably secured together by a plurality of like brackets 73 having their upper and lower ends bolted to the end portions of the flume members. It will be noted that the ends of the flume members are formed with recesses 78 to accomodate drive roller 74. The end of belt 70 opposite roller 74 is carried by an idler roller 75, as indicated in FIG. 6. Belt 70 is formed along its central longitudinal area with a plurality of like holes 76. These holes are spaced apart an equal longitudinal distance. Holes 76 progressively receive complementary pegs 77 formed on the center periphery of drive roller 74, which is driven by the motor 72 as such motor rotates the roller. In this manner, the belt is caused to undergo constant longitudinal movement relative to flume members F' and F", as indicated by the directional arrow in FIG. 5. The provision of this peg drive insures a light-weight positive non-slip transmission of power between roller 74 and belt 70. Additionally, heavy hardware, such as adjustable sprockets or belt take-ups is eliminated.

Referring now to FIG. 12, belt 70 has its ends separably interconnected by conventional means, such as a pair of metallic or synthetic plastic plates 80 formed with complementary tongues and grooves 82 that releasably receive a wire connector finger 84. This arrangement permits the belt 70 to be readily installed upon one of the flume members F.

It will be understood that the flume members F' and F" are so dimensioned that they may be nested in the manner shown in FIG. 2. It should also be noted that the flanges 18' are formed with a plurality of longitudinally spaced apertures 24'. Such apertures 24' are adapted to be utilized with connector assemblies A or B, such as those shown in FIGS. 3 and 4, to rigidly connect adjoining flume members together. Thus, referring to FIG. 8, there is shown a pair of twin power flume members FM of the type disclosed in FIGS. 5 and 6 connected together in end-to-end relationship by means of bolt and nut connector assemblies A of the type shown in FIG. 3. The belt-type twin power flume members are particularly useful in small working spaces. They are easily manipulated into and out of working position and provide rigidity. They also provide sufficient elevation over a boat deck, or other supporting surface. If desired, additional non-belt type flume members may be utilized to afford additional elevation.

Referring now to FIG. 9, there is shown a flume member combination made up of a non-belt type F having one of its ends connected to a belt type FM. As in the case of FIG. 8, the proximate ends of the two flume members are connected together by means of a bolt and nut assembly A of the type shown in FIG. 3, although if desired connector member B may be utilized in place of connector A.

Referring now to FIG. 10, one of the single power belt-type flume members is shown in an inverted position, with the belt 70 facing upwardly. With this arrangement, the flume member may be utilized as a conventional conveyor for power-transporting containers along a desired path.

In the use of the power-driven belt modification FM of the present invention, the belt transports fish 82 along the flume member with or without utilizing the force of gravity. Additionally, the utilization of the powered belt arrangement permits rapid fish movement along the flume members.

It should be noted that the use of a horizontal bottom wall makes possible the incorporation of a power-driven belt in the flume members. Additionally, such horizontal bottom wall configuration prevents the bunching together of fish on the bottom of the flume members, as is the case with prior art half-round fish chutes. Such bunching together of fish creates unnecessary friction which hampers fish movement along such chutes.

Various modifications and changes may be made with respect to the foregoing detailed description without departing from the spirit of the present invention.

I claim:

1. A flume apparatus assembly for transporting fish along a desired path, said apparatus comprising:
   a first plurality of like, telescoping, nestable flume members of generally half-hexagonal transverse cross-sectional having a horizontal bottom wall and upwardly and outwardly extending side walls, said side walls having flanges at their upper ends;
   connector means engageable with said flanges to temporarily interconnect said flume members together overlapped and in a desired longitudinal array; and
   a second plurality of flume members like said first plurality of flume members, with one of each of said second plurality of flume members being positioned inverted below one of said second plurality of flume members and secured thereto.

2. A flume apparatus assembly as set forth in claim 1 wherein at least one of said second plurality of flume members is provided with a power-driven belt to transport fish therealong.

3. A flume apparatus assembly as set forth in claim 2 wherein said belt has its ends separably interconnected for installation upon said one of said flume members.

4. A flume apparatus assembly as set forth in claim 3 wherein said belt is formed with a plurality of longitudinally aligned holes that are spaced apart an equal longitudinal distance, and with said belt-equipped flume member having a post-driven transverse roller for supporting said belt, with said roller being provided with pegs that progressively enter the holes of said belt so as to cause said belt to undergo longitudinal movement relative to its flume member.

5. A flume apparatus assembly as set forth in claim 4 wherein said belt has its ends separably interconnected for installation upon said one of said flume members.

* * * * *

UNITED STATES PATENT OFFICE
CERTIFICATE OF CORRECTION

Patent No. 4,081,075           Dated March 28, 1978

Inventor(s) MARIO J. PURETIC

It is certified that error appears in the above-identified patent and that said Letters Patent are hereby corrected as shown below:

Column 6, line 3, please delete the word following:

member having a "post-driven", and substitute therefor the word --power-driven--.

Signed and Sealed this

Nineteenth Day of December 1978

[SEAL]

*Attest:*

RUTH C. MASON
*Attesting Officer*

DONALD W. BANNER
*Commissioner of Patents and Trademarks*